United States Patent Office 2,801,989
Patented Aug. 6, 1957

2,801,989

GLYCIDYL POLYETHER OF A POLYPHENYLOL

Alford G. Farnham, Caldwell, N. J., assignor to Union Carbide Corporation, a corporation of New York No Drawing. Application April 9, 1954,
Serial No. 422,275

12 Claims. (Cl. 260—47)

This invention relates to novel glycidyl polyethers. The invention more particularly relates to glycidyl polyethers as are obtained by reacting in aqueous caustic alkali, an aliphatic chlorohydrin such as epichlorohydrin or glycerol dichlorohydrin with one or more polyhydric, polynuclear phenols or polyphenylols having three or more phenylol groups in their molecules.

Polynuclear phenols particularly useful in making the glycidyl polyethers of the present invention are described in my copending application Serial No. 368,514, filed July 16, 1953, of which this application is a continuation-in-part. These polynuclear phenols are prepared by reacting in the presence of an acid catalyst such as hydrochloric acid at least three mols and preferably more of a monohydric phenol, such as phenol, cresol and the like having one or more active nuclear positions with one mol of an olefinic aldehyde having the formula $C_nH_{2n-1}.CHO$, $n$ being a whole number from 2 to 6, as exemplified by acrolein, ethyl acrolein, crotonaldehyde and the like.

In the instance of monohydric phenols having only one reactive nuclear position, as for example 2,6-xylenol, one obtains on reaction with an olefinic aldehyde such as acrolein, a triphenylol whose structure is believed represented by either of the following configurations:

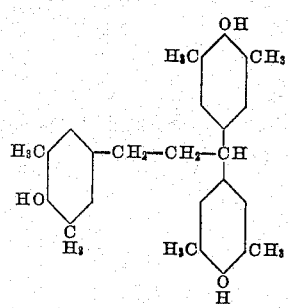

or

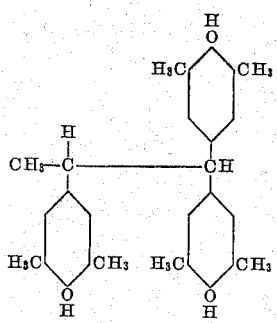

With monohydric phenols having two or three active nuclear positions, there is usually obtained a mixture of polyphenylols, comprising triphenylols similar to those illustrated above; pentaphenylols having a structure as illustrated below for one type of isomer;

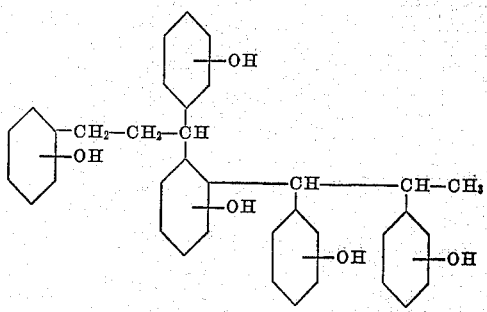

and heptaphenylols, such as are illustrated below:

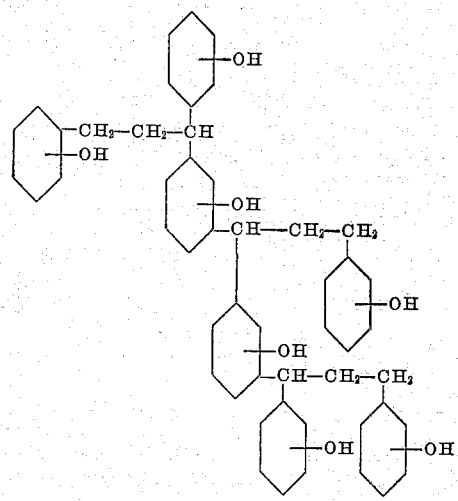

Essentially then, the polyphenylols herein useful for preparing glycidyl polyethers contain on the average $2X+1$ phenylol groups and $$X \text{ tervalent} - (C_nH_{2n}) \overset{|}{C} H \text{ aldehyde residues}$$

linking said phenylol groups, X being a whole number from 1 to 3.

Preparation of typical polyphenylols useful for conversion to glycidyl polyethers is shown by the following examples, such polyphenylols being hereinafter for convenience referred to as polyphenylols "A," "B," "C" and "D."

*Preparation of polyphenylols "A."*—To 2820 grams (30 mols) phenol containing 1.8 cc. concentrated HCl (37%) there were added dropwise 168 grams (3 mols) acrolein at 40° C.–45° C. The reaction was exothermic and cooling was required. It required one hour for all the acrolein to be added to the phenol. After the exothermic reaction ceased, heating was continued for one hour at 100° C. Unreacted phenol was then distilled off under reduced pressure (10–12 mm. Hg) to a temperature of 200° C. (thermometer bulb in the residue). The reddish colored residue was a liquid at 100° C. and solidified to a fusible brittle solid at room temperature. The yield was 865 grams or 90% theoretical based on a calculated molecular weight of 320 for a triphenylol derivative. Analysis of the product gave the following results: Molecular weight 360; OH 15.1%; soluble in acetone and in ethyl alcohol and only slightly soluble in benzene. The determined molecular weight indicates that a major proportion of the reaction product consists of triphenylols.

*Preparation of polyphenylols "B."*—In a two-liter, three-necked flask equipped with a reflux condenser, glass mechanical stirrer, dropping funnel and a thermometer extending nearly to the bottom of the flask there were placed 1410 g. (15 mols) of freshly distilled phenol and 1.8 cc. of concentrated hydrochloric acid (density 1.2). From the dropping funnel 168 g. (3 mols) of acrolein were added slowly to the phenol at 40° C.–45° C. with rapid agitation and external cooling as necessary to hold the reaction at 45° C. or less. After all the acrolein had been added, the mixture was held at 100° C. for a few minutes. The reflux condenser was replaced by a distilling head and unreacted phenol was distilled off under reduced pressure (10–12 mm. Hg) to a temperature of 204° C. (thermometer bulb in residue in flask). Recovered phenol amounted to 715 g. (7.6 mols). The residue weighing 822 g. was poured at about 180° C. onto a polished aluminum sheet and allowed to cool to a reddish brown brittle resinous solid which was soluble in ethyl alcohol and in acetone and insoluble in hexane.

Analysis of the product gave the following result: molecular weight 720; OH, 14.0%.

The determined molecular weight indicates that the reaction product contained but a minor amount of triphenylols in admixture with larger amounts of higher molecular weight polyphenylols whose calculated molecular weights and OH contents are as follows:

Triphenylol, $C_{21}H_{20}O_3$=mol. wt. 320; OH, 15.9%
Pentaphenylol, $C_{36}H_{33}O_5$=mol. wt. 545; OH, 15.6%
Heptaphenylol, $C_{51}H_{46}O_7$=mol wt. 770; OH, 15.4%

*Preparation of polyphenylols "C."*—In a two-liter, three-necked flask connected by glass joints to a glass mechanical stirrer, dropping funnel, reflux condenser, and a thermometer extending nearly to the bottom of the flask were placed 648 g. (6 mols) p-cresol and 2 cc. of concentrated hydrochloric acid (density 1.2). From the dropping funnel 56 g. (1 mol) of freshly distilled acrolein were added dropwise with rapid stirring and cooling of the reaction vessel so that a temperature of 30° C.–40° C. was maintained over a period of fifty minutes. The dark colored mixture was heated briefly to 100° C. and then distilled under reduced pressure (50–75 mm. Hg) to a temperature of 126° C. (thermometer in residue). The glass stirrer was replaced by a stainless steel agitator and the distillation continued under reduced pressure (25 mm. Hg) to a residue temperature of 198° C. The red colored residue was poured into a pan and cooled to a brittle resinous solid at room temperature. Yield 300 g. (83% theory based on acrolein).

Analysis calculated for a triphenylol, $C_{24}H_{26}O_3$ is mol. wt. 362; OH, 14.1%.

The determined molecular weight of 425 and 12.5% OH indicates a product consisting mostly of triphenylols. A distillate of 392 g. (3.6 mols calculated as p-cresol) was recovered.

*Preparation of polyphenylols "D."*—In a two-liter, three-necked flask equipped with reflux condenser, thermometer extending nearly to the bottom of the flask, gas inlet tube and an all glass mechanical stirrer were placed 733 g. (6 mols) xylenol 2,6; 56 g. (1 mol) acrolein and 350 g. toluene. The mixture was held at 29° C.–30° C. while gaseous hydrogen chloride was passed in over a period of one and one-half hours. The light yellow solution darkened to a red color and became black on standing two days. The reflux condenser was replaced by a distilling head and the mixture distilled under reduced pressure (20–25 mm. Hg) to a temperature of 148° C. (thermometer bulb in residue). The residue was a soft, red, resinous material which crystallized on remelting. It was recrystallized three times from 300–400 cc., 70% aqueous acetic acid to give a white granular product of melting point 167° C. to 169° C. The yield was 174 g. (43% based on acrolein). Analysis calculated for $C_{27}H_{32}O_3$: Mol. wt. 404; OH, 12.6%. Found: Mol. wt. 382; OH, 12.4%.

The physical properties and number of terminal epoxy groups (epoxy equivalency) in the average glycidyl polyether molecule obtained by reacting epichlorohydrin with a polynuclear phenol containing three, five or seven phenylol groups in the molecule is basically dependent on the molecular reactant proportions of epichlorohydrin to polynuclear phenol.

With minimum reactant ratios of about one-half equivalent proportion of epichlorohydrin per phenolic group in the polyphenylol, there are obtained resinous glycidyl polyethers of comparatively high melting point (e. g. 90° C. and higher) and which are quite apt to gel during the reaction. These polyethers are of relatively high molecular weight and have a structure essentially comprising a plurality of polyphenylol residues linked together by ethereal oxygen atoms, but with an epoxy equivalency generally less than one. While they have some utility as resinous binders in molding compositions and potting compounds, they do not have the desirable mechanical or electrical properties of glycidyl polyethers which have been purified to remove by-products such as the salt formed during the reaction. Purification of these ethers is difficult to accomplish by ordinary procedures such as washing because of the high melting point characteristics of these ethers.

On the other hand, with increasing reactant proportions of epichlorohydrin to polynuclear phenol, there are obtained progressively lower molecular weight and more fluid polyethers. These polyethers have an epoxy equivalency above 1.0 and harden rapidly to infusible resins in the presence of catalytic quantities of a base. The preferred polyethers, however, are those having an epoxy equivalency higher than 2.0 which have been found to thermoset in the presence of base catalysts or compounds having labile hydrogen atoms, forming infusible resinous products of considerably higher heat-distortion values than base-catalyzed glycidyl polyethers derived from the dihydroxy diphenyl methanes and other polyhydric phenols hitherto suggested by the prior art, which polyethers insofar as I am aware of, have an epoxy equivalency not exceeding 2.0.

To prepare the preferred glycidyl polyethers having an epoxy equivalency of more than two, the epichlorohydrin is employed in reactant proportions corresponding to a quantity of at least one equivalent amount thereof per phenolic hydroxyl group of the polyphenylol.

In addition to having an epoxy equivalency higher than two, it is further preferred that the polyether contains an epoxy content substantially approaching that theoretically possible for the specific polyphenylol reactant since such polyethers are lowest in molecular weight and usually are quite fluid at room temperature. Such polyethers are readily prepared by employing epichlorohydrin in reactant quantities considerably more than one equivalent per phenolic hydroxyl group, namely about three equivalent amounts of epichlorohydrin per phenolic hydroxyl group of the polyphenylol. While still higher ratios of epichlorohydrin can be used, the resultant net increase in epoxy content is not warranted by the cost and difficulty of recovering unconsumed epichlorohydrin.

In explanation of theoretical possible epoxy content, this contemplates a complete conversion of all the phenolic hydroxyl groups in the polyphenylol to terminal, 1,2-epoxy groups

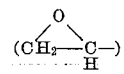

The term "epoxy equivalency" expresses the number of terminal 1,2-epoxy groups

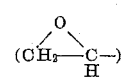

that are present in the average glycidyl polyether molecule.

In the reaction of epichlorohydrin with a polyphenylol, one usually obtains as the final reaction product, a mixture of epoxy polyethers of different molecular weights and content of epoxy groups, the ethers, however, being substantially alike as regards their basic chemical constitution. It is ordinarily not feasible or necessary to separate the individual polyethers from the final reaction product and therefore the epoxy equivalency is conveniently calculated on the basis of the determined average molecular weight of the final reaction product. Thus, by suitable analysis, there is determined the epoxy content which can be expressed as the weight of reaction product, containing a gram mol epoxy, and then this value is converted to the number of epoxy groups per molecule according to the following formula:

$$\text{Epoxy equivalency} = \frac{\text{Average gram m. w. epoxy ether}}{\text{Epoxy content}}$$

A convenient method for determining the epoxy content is as follows.

One gram of the epoxide composition is heated with an excess of pyridine containing pyridine hydrochloride (made by adding 16 cc. of concentrated hydrochloric acid per liter of pyridine) at the boiling point for twenty minutes and then back titrating the excess pyridine hydrochloride with 0.1 N sodium hydroxide using phenolphthalein as indicator and considering that one mol of the HCl is equivalent to one epoxide group.

Thus, for example, a polyether made from a polyphenylol having an average of about six phenolic hydroxyl groups per molecule, which polyether had a gram M. W. of 1153, and an epoxy content of 199.5, the epoxy equivalency is accordingly 5.8.

A practical method for preparing the glycidyl polyethers of the present invention begins with forming a solution of the polyphenylol in a suitable volatile solvent, as for example ethyl alcohol.

The mixture of epichlorohydrin and alcoholic polyphenylol solution is placed in a suitable reaction vessel equipped with an agitator for stirring the contents and a reflux condenser. Alkali such as sodium hydroxide and usually in a fairly concentrated aqueous solution for example, a 50% solution is added to the reaction mixture in stages, the first addition being a catalytic quantity sufficient for Reaction I (below) and the second being the stoichiometric quantity to satisfy the requirements of Reaction II, that is to bind all the chlorine from the epichlorohydrin as sodium chloride, and to form the polyepoxide:

(I)
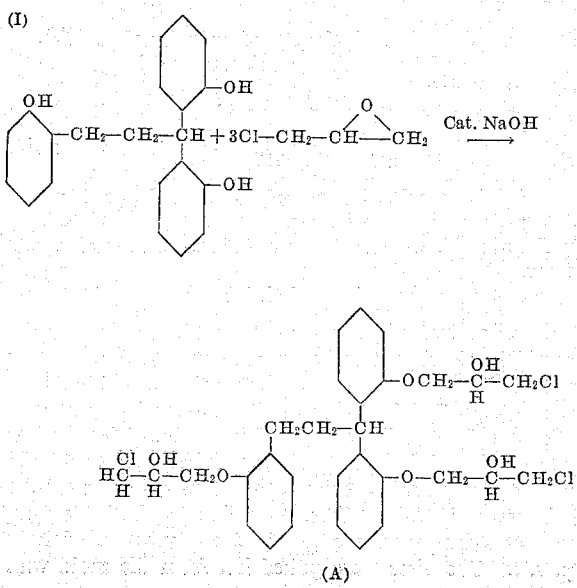
(A)

(II)
A + 3NaOH ⟶
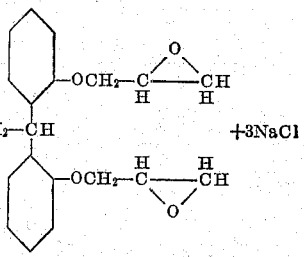
+3NaCl

The temperature of the reaction is maintained at approximately 60° C., and on completion of the reaction which usually requires about two to three hours the mixture is distilled under reduced pressure and the residue dissolved in toluene and transferred to a separatory funnel where it is washed with water until the wash water is no longer alkaline to litmus. The washed toluene solution is distilled under reduced pressure, and the resulting product constitutes the desired ether.

These glycidyl polyethers are quite stable in the absence of catalysts such as acids, bases or amines. With catalysts they polymerize to very stiff gels having a high heat distortion. Also, they will react with polyfunctional organic compounds having a labile hydrogen atom on the functional group to form gels, resins or rubbers. Such polyfunctional materials include polythiols, polycarboxylic acids, polyamines, polyhydric phenols such as bisphenols or polyphenylol methanes. These ethers may be reacted with the diglycidyl ether of diphenylol methane in the presence of alkaline catalysts to give tough hard resins. Also, the ethers may be partially polymerized as by heating to a fusible brittle resin, and then mixed with fillers such as wood flour, asbestos, cotton flock and additional catalyst. These mixtures can then be molded under heat and pressure into objects having good resistance to water, alkali and acid and possessing good electrical qualities. Or such resins can be used to impregnate sheets of fibrous materials such as canvas or glass cloth which can then be laminated under heat and pressure to give high strength laminates.

To obtain substantially thermoset compositions the proportion of polyfunctional organic compounds having labile hydrogen atoms to the glycidyl polyethers should ordinarily comprise mixtures having substantially an equivalent ratio of labile hydrogen atoms to the epoxy groups of the polyether.

In the following examples the practice of the invention defined by the appended claims is illustrated in greater detail. All parts in the examples, unless otherwise characterized are to be considered as being by weight.

EXAMPLE 1

Eight hundred grams polyphenylols "A" (7.5 equivalent OH groups) were dissolved in 525 grams ethyl alcohol and mixed with 2060 grams (22.5 mols) epichlorohydrin in a flask equipped with agitator and reflux. Seven hundred three grams of a 50% aqueous solution of sodium hydroxide were added at the following rates, maintaining a temperature of 60° C.–61° C.; 10% during the first hour; 10% during the next one-half hour and 70% in the next hour. The temperature was then reduced to 50° C.–55° C., and the remaining 10% added during one hour. The reaction mixture was heated an additional fifteen minutes at 55° C., then distilled under sub-atmospheric pressure (50–75 mm. Hg) to a residue temperature (thermometer bulb in residue) of 65° C. The residue remaining in the flask was dissolved in 2500 cc. toluene and transferred to a separatory funnel where it was washed four times with water or until the wash water was no longer alkaline to litmus. The washed toluene solution of the residue was distilled under reduced pressure (50 mm. Hg) to a residue temperature of 110° C. The residual yield was 1180 grams, this being 96.8% theory based on resin. The residue was light amber in color; with a viscosity of 500,000 centipoises at 25° C.; by analysis it had an epoxy content of 180 grams/gram mol epoxy ether or an epoxy equivalency of 3.0. Chloride content was 0.3%.

EXAMPLE 2

One hundred seven grams (1.0 equiv.) of polyphenylols "A" were melted in a beaker at a temperature of 100° C.–110° C. and blended with 197 grams (1.1 equiv.) of the glycidyl polyether product from Example 1. 2.9 cc. of benzyl dimethyl amine (equiv. 0.35% KOH) were stirred in and the mixture poured into a pan and kept at room temperature for sixty hours and then cured one hour at 100° C., one hour at 125° C., ¾ hour at 160° C., and 15 minutes at 175° C. The cured material was quite stiff at 175° C. It had an ASTM heat distortion value of 154° C., and a Rockwell hardness M91. A sample of the above product before curing had a gel time of 55 seconds at 160° C.

A sample of the reaction mixture without the amine catalyst gelled only after heating several hours at 150° C. On continued curing at 150° C. for six hours the resin was a rubbery gel at elevated temperatures but brittle and weak at room temperature.

EXAMPLE 3

One hundred ten grams (.204 mol) of the glycidyl polyether of Example 1 were added to 40.5 grams (.204 mol) of molten 4,4' diamine diphenyl methane and the mixture blended at 90° C.–100° C. and then cast into a small pan. The viscosity of the mix was low enough for pouring and the reaction was not exothermic at this stage. A sample of this mixture gelled in 105 seconds at 160° C. The remainder was cured for ¾ hour at 80° C., ¼ hour at 120° C., ½ hour at 175° C. The resulting gelled product had an ASTM heat distortion of 191° C.; Rockwell hardness M115; flexural p. s. i. 18,400 and modulus $.41 \times 10^6$ p. s. i.

EXAMPLE 4

A glycidyl polyether was prepared from the following reaction mixture:

320 g. polyphenylols "B"_____ 2.64 equiv. by OH.
980 g. epichlorohydrin_____ 10.6 equiv.
320 g. ethanol.

The polyphenylols "B" were dissolved in the ethanol and then mixed with the epichlorohydrin. The mixture was held at 60° C.–65° C. during the addition of 127 g. NaOH (3.18 equivalents) in 127 g. water at the rate of 10% in the first hour, 10% in the next ½ hour, and 80% in the next 1½ hours with good stirring. Ethanol and excess epichlorohydrin were removed by distilling under vacuum to a pot temperature of 70° C. at 28". The residue was dissolved in warm toluene containing a little methyl ethyl ketone and washed several times with hot water. The toluene was distilled off under sub-atmospheric pressure to a pot temperature of 110° C. The residual yield was 461 g. of a reddish colored resin that was brittle and grindable at room temperature (calc. yield 468).

Analyses:

Epoxy content_____ 199.5 g./gram mol epoxy ether.
Epoxy equivalency_____ 5.8.
Hydrolyzable chlorine_ 0.4%.
Mol. wt_____ 1153.

The calculated molecular weight is 1055 or about 10% lower than was found. This glycidyl ether does not harden overnight when heated without an alkaline catalyst at 165° C.

Twenty g. of this glycidyl ether (Q1 equivalent) were ground with 12 g. of polyphenylol "B" (0.1 equiv. alent). Without catalyst this mixture gelled slowly giving a soft gel in about 40 minutes at 165° C. With 2% benzyl dimethylamine the mixture gelled in 15–20 seconds at 165° C. to a high softening resin and with 2% sodium acetate the mixture gelled in sixty seconds at 165° C.

Twenty g. of this glycidyl ether (0.1 equivalent) were intimately mixed by grinding with 5.5 g. 4,4' diamine diphenylmethane (0.11 equiv.). This mixture gelled in 1 minute at 165° C. and became very hard and rigid at this temperature on further curing, yielding a cured product having an ASTM heat-distortion value of 165° C.

Twenty g. of this glycidyl ether mixed with 6.8 g. 4,4'-diamino diphenyl sulfone gelled in eleven minutes at 165° C., becoming very hard on continued curing at this temperature.

A mixture of 10 g. of this glycidyl ether and 1.13 g. diethylene triamine gelled within 5 seconds at 165° C.

EXAMPLE 5

In a one-liter, three-necked flask connected by all glass joints to a glass mechanical stirrer, reflux condenser, thermometer extending nearly to the bottom of the flask and a dropping funnel, were placed 102 grams (0.75 equivalent) of polyphenylols "C," 208 grams (2.25 equivalents) epichlorohydrin and 75 grams ethanol. From the dropping funnel 75.6 grams (0.94 mole) of 50% aqueous solution of sodium hydroxide were added dropwise at 60° C.–65° C. over a period of one hour and ten minutes so that temperature of the reaction mixture did not exceed 65° C. The reaction mixture was distilled under reduced pressure (50–75 mm. Hg) to a residue temperature of 65° C. Two hundred and fifty grams of toluene and 200 grams of water were added to the residue in the flasks and the mixture well agitated. The mixture was transferred to a separatory funnel, the water layer removed and the toluene layer washed four times with 150 gram portions of water. The washed toluene layer was transferred to a flask and distilled under reduced pressure (50 mm. Hg) to a residue temperature (thermometer bulb in residue) of 110° C. The residue product was a dark brown resinous solid, the yield being 124 grams.

Analysis calculated for $C_{33}H_{38}O_6$: M. W. 531; epoxy content=177 g./gram mol epoxy ether.

Found: M. W. 670; epoxy content 246 g./gram mol epoxy ether.

Epoxy equivalency=2.7.

EXAMPLE 6

In a similar manner as described in Example 5 for the condensation of the polyphenylols derived from cresol with epichlorohydrin the following materials were caused to react:

101 grams (0.75 equivalents) of polyphenylols "D"
208 grams (2.25 equivalents) epichlorohydrin
75 grams ethanol
75.6 grams of a 50% aqueous solution sodium hydroxide The product of the reaction was a light red resin. Yield 125 grams (97.5% based on acrolein).

Analysis calculated for $C_{36}H_{44}O_6$: M. W. 573 epoxy 191 g./gram mol epoxy ether.

Found: M. W. 657; epoxy 216 g./gram mol epoxy ether.

EXAMPLE 7

One hundred ninety-seven grams (1.1 equiv.) of the glycidyl polyether from Example 1 were melted together with 107 grams (1.0 equiv.) of polyphenylols "A" at about 100° C. 2.9 cc. benzyl dimethyl amine were then added and the mixture poured into pan. The product cooled to a brittle fusible resin. Fifty grams of the resin were ball milled with 50 grams wood flour and the mixture molded into discs. Molding required five minutes at a temperature of 140° C. and pressure of 2000 p. s. i. The discs were pulled hot from the mold with no blistering or distortion. When the discs were boiled for four hours in 10% aqueous NaOH solution the absorption was 13.4% with no attack on the resin but some swelling of the wood flour. Arc resistance of the molded pieces was 67 seconds. After exposure to salt water, no arcing occurred when a potential of 220 volts was applied over the disc surface, whereas with conventional phenol-aldehyde molding materials arcing occurs immediately.

In each composition the ingredients were first ball milled together and then compounded on milling rolls at about 100° C. The cooled sheets from the milling rolls were granulated, and the granulated composition molded into discs, bowls and test bars. Molding cycle comprised five minutes at 140° C.–150° C. and pressure of 2000 p. s. i. The pieces were discharged hot from the molds without blistering or distortion. The properties of these molding compositions are listed in Table I.

*Table I*

PROPERTIES OF MINERAL-FILLED MOLDING MATERIAL

| Test | I | | | II | | |
|---|---|---|---|---|---|---|
| | As Molded | After 200 Hrs. at 200° C. | After 200 Hrs. at 250° C. | As Molded | After 200 Hrs. at 200° C. | After 200 Hrs. at 250° C. |
| Resin content, percent | 31.4 | | | 34.5 | | |
| Tensile strength, p. s. i | 5,000 | [1] 5,450 | | 6,700 | [1] 5,250 | |
| Flexural strength, p. s. i | 9,400 | 7,880 | 7,850 | 13,000 | 10,100 | 7,550 |
| Modulus | 1.17×10⁶ | 1.09×10⁶ | 1.64×10⁶ | 1.34×10⁶ | 1.44×10⁶ | 1.73×10⁶ |
| Izod Impact ft. lbs., p. s. i | .33 | | | .32 | | |
| Rockwell Hardness M | .96 | | | 109 | | |
| Heat Distortion ° C. (ASTM) | 128 | | | 127 | | |
| Arc Resistance, Seconds | 188 | 188 | | 193 | 183 | |
| Wt. Loss Percent on Heating [1] | | .86 | 3.8 | | .16 | 1.5 |
| Percent Gain 5 hr. boil in Water | +1.1 | | | +.41 | | |
| 10% NaOH (aqueous) | .9 | | | .32 | | |
| 10% H₂SO₄ (aqueous) | −2.7 | | | .06 | | |

[1] 430 hours at 200° C.

EXAMPLE 8

Three hundred seventy-six grams (2.1 gram equiv.) glycidyl polyether from Example 1 were melted together with 214 grams (2.0 equiv.) of polyphenylols "A" at 100° C.–110° C. and then 5.5 cc. benzyl dimethyl amine were added slowly with stirring. The mixture was poured into a pan. It cooled to a brittle fusible resin. Fifty grams of this resin were ball milled with fifty grams of nylon flock. Discs were molded from this blend, molding conditions being five minutes at a temperature of 140° C. and at a pressure of 2000 p. s. i. The discs were easily discharged hot from the molds without distortion. A disc heated twenty-four hours at 200° C. changed color from grey to brown, but the surface gloss was unaffected.

The molded discs had the following properties:

| | |
|---|---|
| Water absorption—4 hour boil_____percent_ | 0.89 |
| 10% caustic absorption—4 hour boil__do___ | .76 |
| Flexural, p. s. i | 10,600 |
| Modulus, p. s. i | .37×10⁶ |
| Work to break, ft. lbs. per inch cube | 1.92 |
| Izod, ft. lbs. per inch of notch | 1.12 |

EXAMPLE 9

Seven hundred fifty-six grams (4.2 equivalents) glycidyl polyether from Example 1 were melted at 100° C.–110° C. with 428 grams (4.0 equivalents) of polyphenylols "A," 7.5 cc. of benzyl dimethyl amine slowly were then added with stirring. The reaction product was poured in a thin layer in a pan and cooled to a brittle fusible resin. Two molding material compositions were prepared as follows:

I. 31.35 grams of resin
   0.5 gram of a catalyst made by melting at 100° C. 50 parts of polyphenylols "A" with 25 grams benzyl dimethyl amine which when cooled was a brittle grindable resin.
   2.5 grams calcium stearate
   12.5 grams whiting
   53.15 grams asbestos flock
II. 34.5 grams resin
   .5 grams catalyst as in I.
   62.5 grams clay
   2.5 grams calcium stearate

EXAMPLE 10

One hundred eighty-nine grams (1 equivalent) of the glycidyl polyether from Example 1 were melted at 134° C. with 50.6 grams (1.1 equivalent) of benzidine (4,4'-diamino biphenyl) and the molten mixture transferred to a dip pan heated to 90° C.–95° C. A strip of glass cloth 78″ x 6″ was coated with this composition by drawing it through the mixture in the dip pan and wiping off the excess. Resin content was 46%. A stack of nine 6″ x 6″ sheets were pressed at gradually increasing pressures up to 500 p. s. i., and a temperature of 160° C. for 45 to 60 minutes. The panel was cooled and removed from press. It was dark black and translucent.

EXAMPLE 11

One hundred eighty-nine grams (1.0 equivalent) of the glycidyl polyether from Example 1 were melted at 120° C. with 54.5 grams (1.1 equivalent) of diamino diphenyl methane. As soon as the mixture was well blended it was transferred to a dip pan heated at 90° C.–95° C. Strips of glass cloth were coated with this composition by drawing them through the mixture in the dip pan and scraping off the excess. The strips were dried one hour at room temperature. Resin content was 50%.

(a) The strips were cut to 6″ x 6″ sheets and a stack of 9 sheets was pressed at a gradually increasing pressure up to 500 p. s. i., and at a temperature of 300° F. for one hour. Then the molded panel was cooled and removed from the press. It was light yellow in color and translucent. Resin content was 29%.

(b) Another stack of nine sheets was prepared, these sheets having had an additional 24-hour cure at room temperature. The stack was pressed at 1000 p. s. i. and temperature of 300° F. for one hour. The panel was cooled and removed from press. It was light amber in color with a very fine surface. Resin content was 50%. This higher resin content obtained over (a) is due to the fact that the resin was further advanced before pressing into a panel and very little resin flowed out during the pressing operation.

Table II gives the properties of the panels prepared in Example 10 and Example 11, (a) and (b).

Table II

|  | Ex. 10 | Ex. 11 (a) | Ex. 11 (b) |
| --- | --- | --- | --- |
| Treating Temperature, °C | 90-95 | 90-95 | 90-95 |
| Resin Content of Treated Cloth, percent | 46 | 50 | 50 |
| Precure, 24 hrs. at R. T. |  |  |  |
| Press Cure 1 Hr. at 160° C., p. s. i. | 0-500 | 0-500 | 1,000 |
| Resin Content of panel, percent | 35 | 29 | 50 |
| Flexural Strength at 25° C., p. s. i. | 60,500 | 66,700 | 56,200 |
| Flexural Strength at 200° C., p. s. i. | 31,600 | 34,300 | 28,000 |
| Mod. of Elasticity at: |  |  |  |
| 25° C.×10⁶ p. s. i. | 3.67 | 4.25 | 2.78 |
| 200° C.×10⁶ p. s. i. | 3.61 | 2.91 | 2.18 |

EXAMPLE 12

(a) Eighteen grams (1 equivalent) of the polyepoxide from Example 1 were melted at 110° C.–125° C. and mixed with 15 grams (1 equivalent) of polyphenylols "A." The mixture was cooled slightly and 6.7 cc. of an 0.3 gram/cc. methanol solution of KOH added. The mixture was poured immediately on a hot plate at 160° C. and mixed with a spatula. The mixture gelled in 36–42 seconds.

(b) Eighteen grams of the polyepoxide as in (a) were melted at 110° C.–125° C. and mixed with 22.2 grams (1.5 equivalent) of phthalic anhydride. The mixture was cooled slightly and 9.5 cc. of an 0.3 gram/cc. methanol solution of KOH added. The mixture was gelled at 160° C. as in (a). The gel time was 18–24 seconds.

(c) Eighteen grams of the polyepoxide as in (a) were melted at 110° C.–125° C. and mixed with 7.3 grams (1 equivalent) of adipic acid. The mixture was cooled slightly and 6.2 cc. of an 0.3 gram/cc. methanol solution of KOH added. The mixture was gelled at 160° C. as in (a). Gel time was three minutes.

(d) Eighteen grams of the polyepoxide as in (a) were melted at 110° C.–125° C. and mixed with fifty grams (1 equivalent) of Thiokol (M. W. 1000) a commercial elastothiomer representative of the class of polythiopolymercaptans having terminal thiol groups according to the formula:

$$HS(CH_2CH_2OCH_2OCH_2CH_2SS)_n CH_2CH_2OCH_2OCH_2CH_2SH$$

where $n$ is an integer from 1 to 50. The mixture was cooled slightly and 15.1 cc. of an 0.3 gram/cc. methanol solution of KOH added. The mixture was gelled at 160° C. as in (a). Gel time was six seconds.

(e) Eighteen grams of the polyepoxide as in (a) were melted at 110° C.–125° C. and mixed with 2.1 cc. (1 equivalent) diethylene triamine. The mixture gelled at 160° C. in 16–21 seconds.

(f) Eighteen grams of the polyepoxide as in (a) were melted at 110° C.–125° C. and mixed with seven grams (1 equivalent) of the adduct of 2 mols acrylonitrile and 1 mol diethylene triamine. The mixture gelled at 160° C. in thirteen seconds.

EXAMPLE 13

(a) 24.6 grams (1 equivalent) of the polyepoxide from Example 5 were melted at 110° C.–125° C. and mixed with 12.5 grams (1 equivalent) of polyphenylols "C." The mixture was cooled slightly and 10 cc. of an 0.3 gram/cc. methanol solution of KOH added. The mixture gelled at 160° C. in two minutes, fifty seconds.

(b) 24.6 grams of the polyepoxide as in (a) were reacted with 22.2 grams phthalic anhydride and 11.1 cc. KOH solution as described in Example 12 (b). The mixture gelled at 160° C. in 1 minute, 53 seconds.

(c) 24.6 grams of the polyepoxide as in (a) were reacted with 7.3 grams adipic acid and 9.8 cc. of KOH solution as described in Example 12 (c). The mixture gelled at 160° C. in sixty minutes.

(d) 24.6 grams of the epoxide as in (a) were reacted with 50 grams Thiokol M. W. 1000 and 14.8 cc. KOH solution as described in Example 12 (d). The mixture gelled at 160° C. in six seconds.

(e) 24.6 grams of the epoxide as in (a) were mixed with 2.1 cc. diethylene triamine. The mixture gelled at 160° C. in 12 seconds.

(f) 24.6 grams of the epoxide as in (a) were melted with 7 grams of the acrylonitrile adduct of diethylene triamine. The mixture gelled at 160° C. in 1 minute, 54 seconds.

Insofar as is presently known, all the thermoset compositions of the present invention based on reacted mixtures of a glycidyl polyether having an epoxy equivalency more than 2 and a substantially equivalent amount of organic compound having labile hydrogen atoms such as a diphenylol methane, a polyphenylol, or a diamine have consistently shown considerably higher heat-distortion values than similar reacted mixtures based on glycidyl polyether having an epoxy equivalency of two or less such as the diglycidyl ethers of dihydroxy diphenyl methanes.

For example, the thermoset reacted mixture of Example 2 has a heat-distortion value of 154° C.; a similar reacted composition of the diglycidyl ether of dihydroxydiphenylmethylmethane having an epoxy containing compound as in Example 2, namely polyphenylols "A" has a heat-distortion value of only 100° C.

The thermoset reacted composition of Example 3 consisting of a reacted mixture of 4,4'-diamine diphenylmethane and the glycidyl polyether of Example 1 has a heat-distortion value of 191° C. This is considerably higher than the 133° C. heat-distortion value of a similar reacted mixture of 4,4'-diamine diphenylmethane and the diglycidyl ether of dihydroxydiphenylmethylmethane (epoxy equivalency 1.9).

A high heat-distortion value is an important desideratum in the use of these polyethers as molded or otherwise shaped articles as for example electrical relays, gears, etc. exposed to high temperatures and whose mechanical or electrical function would be impaired by dimensional changes caused by high temperature.

I claim:

1. A glycidyl polyether of a polyphenylol having $2x+1$ phenylol groups and

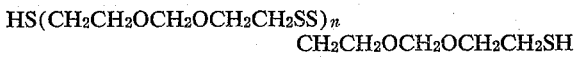

$x$ tervalent—$(C_nH_{2n})\overset{|}{\underset{|}{C}}H$ aldehyde residues linking said phenylol groups, $x$ being a whole number from 1 to 3 and $n$ being a whole number from 2 to 6, said polyether having a 1,2-epoxy equivalency of more than 2.

2. A glycidyl polyether of a polyphenylol consisting of three phenylol groups linked together by a single tervalent—$(C_nH_{2n})\overset{|}{\underset{|}{C}}H$ aldehyde residue in which $n$ is a whole number from 2 to 6, said polyether having a 1,2-epoxy equivalency of more than 2.

3. Curable composition comprising the product of claim 2 in admixture with a polyfunctional organic compound having a labile hydrogen atom on the functional group and selected from the group consisting of polythiols, polycarboxylic acids, polyamines and polyhydric phenols.

4. Process for preparing a glycidyl polyether which comprises reacting together an aliphatic chlorohydrin selected from the group consisting of epichlorohydrin and glycerol dichlorohydrin and a polyphenylol having $2x+1$ phenylol groups and $x$ tervalent—$(C_nH_{2n})\overset{|}{\underset{|}{C}}H$ aldehyde residues linking said phenylol groups, $x$ being a whole number from 1 to 3 and $n$ being a whole number from 2 to 6, in the presence of sufficient caustic alkali to combine with the chlorine of the chlorohydrin, the molar ratio of aliphatic chlorohydrin to polyphenylol being sufficient to produce a polyether having a 1,2-epoxy equivalency greater than 2.0.

5. Process for preparing a glycidyl polyether having a 1,2-epoxy equivalency more than 2 which comprises reacting a polyphenylol having $2x+1$ phenylol groups and $$x \text{ tervalent}-(C_nH_{2n})\overset{|}{\underset{|}{C}}H \text{ aldehyde residues}$$

linking said phenylol groups, $x$ being a whole number from 1 to 3 and $n$ being a whole number from 2 to 6 with at least one equivalent amount of epichlorohydrin per phenolic hydroxyl group of the polyphenylol and in the presence of sufficient caustic alkali to combine with the chlorine of the chlorohydrin.

6. A glycidyl polyether of a polyphenylol condensation product of phenol and acrolein, said product having $2x+1$ phenylol groups, $x$ being a whole number from 1 to 3 and said polyether having a 1,2-epoxy equivalency of more than 2.

7. A glycidyl polyether of a triphenylol condensation product of phenol and acrolein, said polyether having a 1,2-epoxy equivalency of more than 2.

8. A glycidyl polyether of a triphenylol condensation product of a monohydric mononuclear phenol having only one reactive nuclear position and an olefinic aldehyde having the formula $C_nH_{2n-1} \cdot CHO$, $n$ being a whole number from 2 to 6, said polyether having a 1,2-epoxy equivalency of more than 2.

9. A glycidyl polyether of a triphenylol condensation product of 2,6-xylenol and an olefinic aldehyde having the formula $C_nH_{2n-1} \cdot CHO$, $n$ being a whole number from 2 to 6, said polyether having a 1,2-epoxy equivalency of more than 2.

10. A glycidyl polyether of a triphenylol condensation product of 2,6-xylenol and acrolein, said polyether having a 1,2-epoxy equivalency of more than 2.

11. A glycidyl polyether of a triphenylol condensation product of a cresol and an olefinic aldehyde having the formula $C_nH_{2n-1} \cdot CHO$, $n$ being a whole number from 2 to 6, said polyether having a 1,2-epoxy equivalency of more than 2.

12. A glycidyl polyether of a triphenylol condensation product of para-cresol and acrolein, said polyether having a 1,2-epoxy equivalency of more than 2.

References Cited in the file of this patent

UNITED STATES PATENTS

| | | |
|---|---|---|
| 2,193,327 | Blass et al. | Mar. 12, 1940 |
| 2,615,008 | Greenlee | Oct. 21, 1952 |

FOREIGN PATENTS

| | | |
|---|---|---|
| 676,117 | Germany | May 21, 1939 |